Jan. 13, 1953   J. HALLER   2,625,452
POROUS BEARING WITH LUBRICANT RESERVOIR THEREIN
Filed March 14, 1949

INVENTOR.
John Haller
BY Barthel & Bugbee
ATTORNEYS

Patented Jan. 13, 1953

2,625,452

UNITED STATES PATENT OFFICE 2,625,452

POROUS BEARING WITH LUBRICANT RESERVOIR THEREIN

John Haller, Detroit, Mich.

Application March 14, 1949, Serial No. 81,274

7 Claims. (Cl. 308—240)

This invention relates to bearings and, in particular, to bearings of porous material, such as powdered metal.

One object of this invention is to provide a bearing of porous material having a reservoir within the walls of the bearing for holding a reserve supply of oil.

Another object is to provide a bearing of porous material having an annular oil chamber within the bearing side walls, this chamber encircling the bearing bore and providing a reserve supply of oil which passes through the pores of the material into the bearing bore and lubricates the shaft or other rotary element journaled therein.

Figure 1:
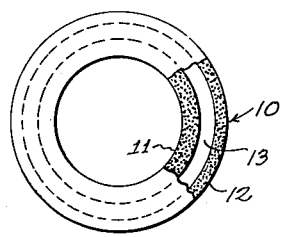
Figure 1 is an end elevation, partly in vertical section, of a bearing made according to a preferred from of the invention.
Figure 3:
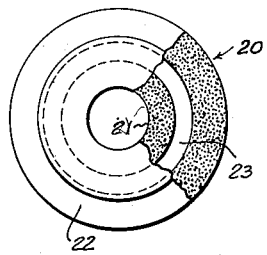
Figure 3 is an end elevation, partly in vertical section, of a slightly modified bearing according to the invention.
Figure 2:
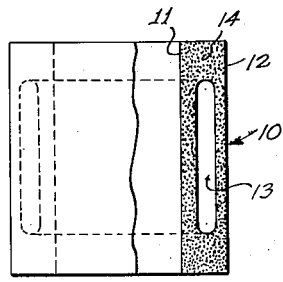
Figure 2 is a top plan view, partly in horizontal section, of the bearing shown in Figure 1.
Figure 4:
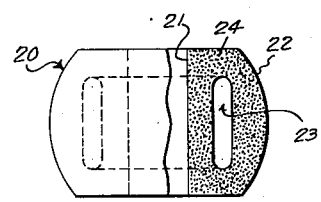
Figure 4 is a top plan view, partly in horizontal section, of the bearing shown in Figure 3.
Figure 5:
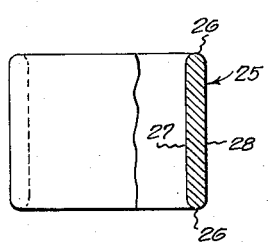
Figure 6:
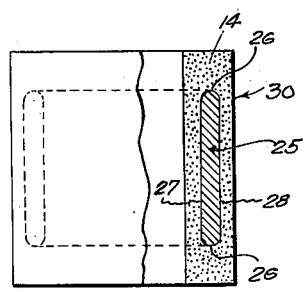

Figure 5 is a top plan view, partly in horizontal section, of an infiltratable core used in the process of making the bearings shown in Figures 1 to 4 inclusive; and Figure 6 is a top plan view partly in section, of the bearing of Figures 1 and 2 in an intermediate stage of manufacture with the infiltratable core in position prior to its heating to cause the core to infiltrate the bearing side wall.

In general, the bearing of this invention consists of a bearing body of porous material, such as powdered metal, having a bearing bore through it, the bearing body having a chamber in its side wall for receiving a reserve supply of oil. This oil seeps through the porous material to the bearing surface of the bearing bore and thus constantly replenishes the oil within the pores of the bearing side wall so that oil is always available within the bearing bore for the lubrication of the shaft or other rotating element journaled in the bearing bore.

The process of making this bearing includes the preparation of a core of infiltratable material such as a copper-zinc alloy which is placed in the interior of the side wall of the bearing while the powdered metal, such as powdered iron, or other powdered material is being compressed to form the bearing. The partially finished bearing containing the core is then heated, such as by sintering the powdered metal, whereupon the core material becomes fluid and disappears by infiltration into the pores of the material, leaving a hollow oil chamber within the bearing side wall for the reception of the oil. The bearing material in its pressing stage is left sufficiently porous to absorb the core material completely and still possess a sufficient porosity to permit flow of oil from the oil chamber or reservoir to the bearing bore after it has been sintered and the core material has infiltrated into the bearing wall pores.

Referring to the drawings in detail, Figures 1 and 2 show a bearing, generally designated 10, of bushing or hollow cylindrical form having a bearing bore 11 and an outer surface 12. The bearing 10 is provided with an oil chamber 13 of any suitable form within the side wall 14 of the bearing. This chamber 13 is preferably formed so as to partially or wholly encircle the bearing bore 11 so as to insure a supply of oil as near as possible to the bearing bore, while providing a sufficient side wall thickness to properly support the machine element journaled in the bearing. Figures 1 to 4 inclusive show the oil chamber or reservoir 13 as made in an annular form, which is a preferred form of the reservoir.

The modified bearing, generally designated 20, shown in Figures 3 and 4, is similar in general construction to the bearing shown in Figures 1 and 2 and similarly has a bearing bore 21 and and outer surface 22 with an annular oil chamber or reservoir 23 in the bearing side wall 24. The outer surface 22 of the modified bearing 20, however, has an approximately spherical surface so that when it is placed in a correspondingly spherical socket, it will form a self-aligning bearing.

In the process of making the bearings shown in Figures 1 to 4 inclusive, a core 25 of infiltratable material is prepared and provided with a shape corresponding to the shape of the oil chamber or reservoir 13 or 23 desired in the final bearing. The core 25 as shown in Figure 5 is of annular form with curved opposite ends 26 and with internal and external surfaces 27 and 28 respectively. If the bearing 10 or 20 is to be made of powdered iron, it has been found that the core 25 may be made of an alloy of approximately 85% copper and 15% zinc. The core 25 may be used either in the form of a solid body or in the form of a sintered core of powdered copper and zinc, as desired.

After the core 25 has been produced in its desired form, it is mounted in the cavity of a die and surrounded by the metal powder, such as iron, of which the bearing is to be composed. The die cavity may be formed in the die used in any suitable molding press, such as the press disclosed and claimed in my co-pending application Serial No. 780,851, filed October 20, 1947, for Briquetting Machine, and the procedure may follow that disclosed in my co-pending application Serial No. 70,056, filed January 10, 1949, for Powdered Metal Article and Process of Making the Same. When the die cavity has been properly filled, the press plunger or plungers are reciprocated, compressing the powdered metal of the bearing around the core 25. The quantity of metal powder and the extent of compression are so regulated that the desired porosity is obtained. I have found that a porosity of about 18 per cent is satisfactory for the present purpose.

After the partially finished bearing containing the core 25 in its side wall 14 or 24 is thus completed (Figure 6), the assembly thereof, generally designated 30, is placed in a sintering oven and heated to a sufficiently high temperature to melt the core 25 and cause it to infiltrate into the pores of the bearing side wall 14. For a small bearing, such as those shown in Figures 1 to 4 inclusive, I have found that a sintering period of about one-half hour at approximately 2020° F. is satisfactory.

When the copper-zinc alloy or mixture composing the core 25 infiltrates into the pores of the bearing, it imparts an increased hardness and tensile strength to the iron of which the bearing is composed. At the same time, the core material, after infiltration, does not clog the pores of the bearing metal completely, but leaves sufficient porosity therein for the flow of the lubricating oil. After the sintering operation has been completed, it is found that the core 25 has disappeared completely into the side wall 14 or 24 of the bearing 10 or 20, leaving a hollow chamber or cavity which is of the same size and shape as the core 25 originally possessed.

The bearing 20 of Figures 3 and 4 is produced in a similar way to the bearing 10 of Figures 1 and 2, except that the die cavity has to have a spherical or partially spherical shape in order to produce the spherical or partially spherical outer surface 22. In order for the bearing to be self-aligning, the center of curvature of the surface 22 should preferably lie upon the axis of the bearing bore 21. In producing the spherical or partially spherical surface 22, the upper and lower plungers of the molding press may be provided with correspondingly spherical or partially spherical cavities.

To fill the bearing 10 or 20 with oil, the bearing may be placed in the oil in a vacuum tank which is then evacuated. The air in the bearing reservoir 13 or 23, as well as in the pores of the bearing, bubbles out through the pores and is taken away by the vacuum pump along with the air in the vacuum tank. When the air is again admitted to the vacuum tank, the oil is forced through the pores of the bearing into the reservoir or chamber 13 or 23 and fills all parts of the bearing. Another method of filling the bearing with oil is to boil it in hot oil for a sufficiently long time, such as 20 or 30 minutes, until all the air bubbles out through the pores of the bearing. The bearing is then transferred quickly to a bath of cold oil and fills immediately with this oil, which is sucked in through the pores of the bearing. The cold oil may be at room temperature or it may be cooled below room temperature.

The bearing of this invention contains enough oil to last the life of the bearing and will operate over a long period of time without requiring any attention on the part of the operator. The bearing is thus especially suitable for use in inaccessible locations where the lubrication of an ordinary bearing would tend to be neglected. The bearing of the present invention gives a longer operating life and a more satisfactory performance than ordinary porous metal bearings because in such ordinary bearings, the quantity of oil in the bearing is very limited, and the bearing frequently becomes inadequately lubricated, especially under severe conditions of operation. Moreover, in such ordinary bearings, the oil has to travel considerable distances through the pores from the outer regions of the bearing when the oil in the pores near the bearing bore has been used up. In the bearing of the present invention, however, the oil in the large reservoir 13 or 23 is located close to the bearing bore to be lubricated and has to travel only a short distance to the point of lubrication. As previously stated, the pores of the metal are not clogged to a detrimental extent by the core metal as it infiltrates the pores, since the core metal alloys itself with the powdered bearing metal and hence leaves sufficient pores for adequate passage of lubricant. In so doing, the core metal increases the density and strength of the portion of the bearing into which it has infiltrated, especially that portion adjacent the bearing bore which, as previously stated, is near the lubricant reservoir produced by this infiltration. Accordingly, both the capacity of the bearing to sustain heavy working loads and its length of life are greatly increased over bearings lacking such infiltration. Moreover, since the infiltration takes place internally, there is no surface erosion of the external surfaces of the bearing, as has hitherto occurred when external infiltration has been attempted to increase the density and strength of the bearing. Such erosion has resulted from the affinity of the infiltrated metal for the infiltrating metal. Since the lubricant chamber or oil well 13 or 23 is completely enclosed within the bearing body 14 or 24 and substantially entirely surrounded on all sides by the porous sintered powdered metal walls of said bearing body, the bearing can be used in any position, whether horizontal, vertical or inclined. Furthermore, no possible leakage of the lubricant can occur since it can escape only through the minute pores of the powdered metal walls which enclose the lubricant chamber upon all sides, as it has no cover plates causing cracks through which the lubricant can escape. Thus a vertical shaft can be rotatably or reciprocably supported as easily as a horizontal shaft without leakage of lubricant and as adequately lubricated, because the position of the bearing makes no vital difference in its operation. Moreover, since the walls surrounding the lubricant chamber or oil well 13 and 23 are entirely of porous sintered powdered metal, the lubricant seeps through them in all directions, lubricating all surfaces of the bearing, both external and internal. Thus, if the self-aligning bearing of Figure 4, for example, is employed to rotatably support a shaft and at the same time oscillate in a pillow block containing a spherical socket having a curvature corresponding to the curvature of the spherical outer surface 22, and if, in addition, the bearing abuts a thrust washer on one or both ends, the present invention lubricates all of these surfaces simultaneously and satisfactorily in an efficient manner.

What I claim is:

1. A bearing comprising a hollow bearing body of approximately annular form composed of porous sintered powdered metal throughout substantially its entire extent and having an internal bearing surface therein, said body having a lubricant chamber in a wall thereof disposed outwardly of said bearing surface and communicating with said bearing surface through the pores in said wall, said lubricant chamber being completely enclosed within said bearing body and substantially entirely surrounded on all sides by the porous sintered powdered metal walls of said bearing body.

2. A bearing comprising a hollow bearing body of approximately annular form composed of porous sintered powdered metal throughout substantially its entire extent and having a bearing bore therein, said body having a lubricant chamber in a wall thereof disposed outwardly of said bearing bore and communicating with said bearing bore through the pores in said wall, the portion of said wall between said bearing bore and said chamber being impregnated with a metal which is dissimilar to the metal of said bearing body.

3. A bearing comprising a hollow bearing body of approximately annular form composed of porous sintered powdered metal throughout substantially its entire extent and having a bearing bore therein, said body having a lubricant chamber in a wall thereof disposed outwardly of said bearing bore and at least partially encircling said bearing bore and communicating with said bearing bore through the pores in said wall, the portion of said wall between said bearing bore and said chamber being impregnated with a metal which is dissimilar to the metal of said bearing body.

4. A bearing comprising a hollow bearing body of approximately annular form composed of porous sintered powdered metal throughout substantially its entire extent and having a bearing bore therein, said body having an annular lubricant chamber in a wall thereof disposed outwardly of said bearing bore and encircling said bearing bore and communicating with said bearing bore through the pores in said wall, the portion of said wall between said bearing bore and said chamber being impregnated with a metal which is dissimilar to the metal of said bearing body.

5. A bearing comprising a hollow cylindrical porous bushing of approximately annular form composed of powdered metal throughout substantially its entire extent and having a bearing bore therein, said bushing having a lubricant chamber in a wall thereof disposed outwardly of said bearing bore and communicating with said bearing bore through the pores in said bushing, the portion of said wall between said bearing bore and said chamber being impregnated with a metal which is dissimilar to the metal of said bearing body.

6. A bearing comprising a hollow cylindrical porous bushing of approximately annular form composed of powdered metal throughout substantially its entire extent and having a bearing bore therein, said bushing having an annular lubricant chamber in a wall thereof disposed outwardly of said bearing bore and communicating with said bearing bore through the pores in said bushing, the portion of said wall between said bearing bore and said chamber being impregnated with a metal which is dissimilar to the metal of said bearing body.

7. A bearing comprising a hollow bearing body of approximately annular form composed of porous material throughout substantially its entire extent and having a bearing bore therein and a partially spherical outer bearing surface thereon, said body having a lubricant chamber in a wall thereof disposed outwardly of said bearing surface and communicating with said bearing bore through the pores in said wall, the portion of said wall between said bearing bore and said chamber being impregnated with a metal which is dissimilar to the metal of said bearing body.

JOHN HALLER.

REFERENCES CITED

The following references are of record in the file of this patent:

UNITED STATES PATENTS

| Number | Name | Date |
| --- | --- | --- |
| 2,035,519 | Apple | Mar. 31, 1936 |
| 2,084,756 | Albrecht | June 22, 1937 |
| 2,093,800 | May | Sept. 21, 1937 |
| 2,275,538 | Marvin | Mar. 10, 1942 |
| 2,308,609 | Koch | Jan. 16, 1943 |